Nov. 12, 1935.  B. A. HOOK  2,020,645
PREPARING GREENS FOR CANNING
Filed July 12, 1933
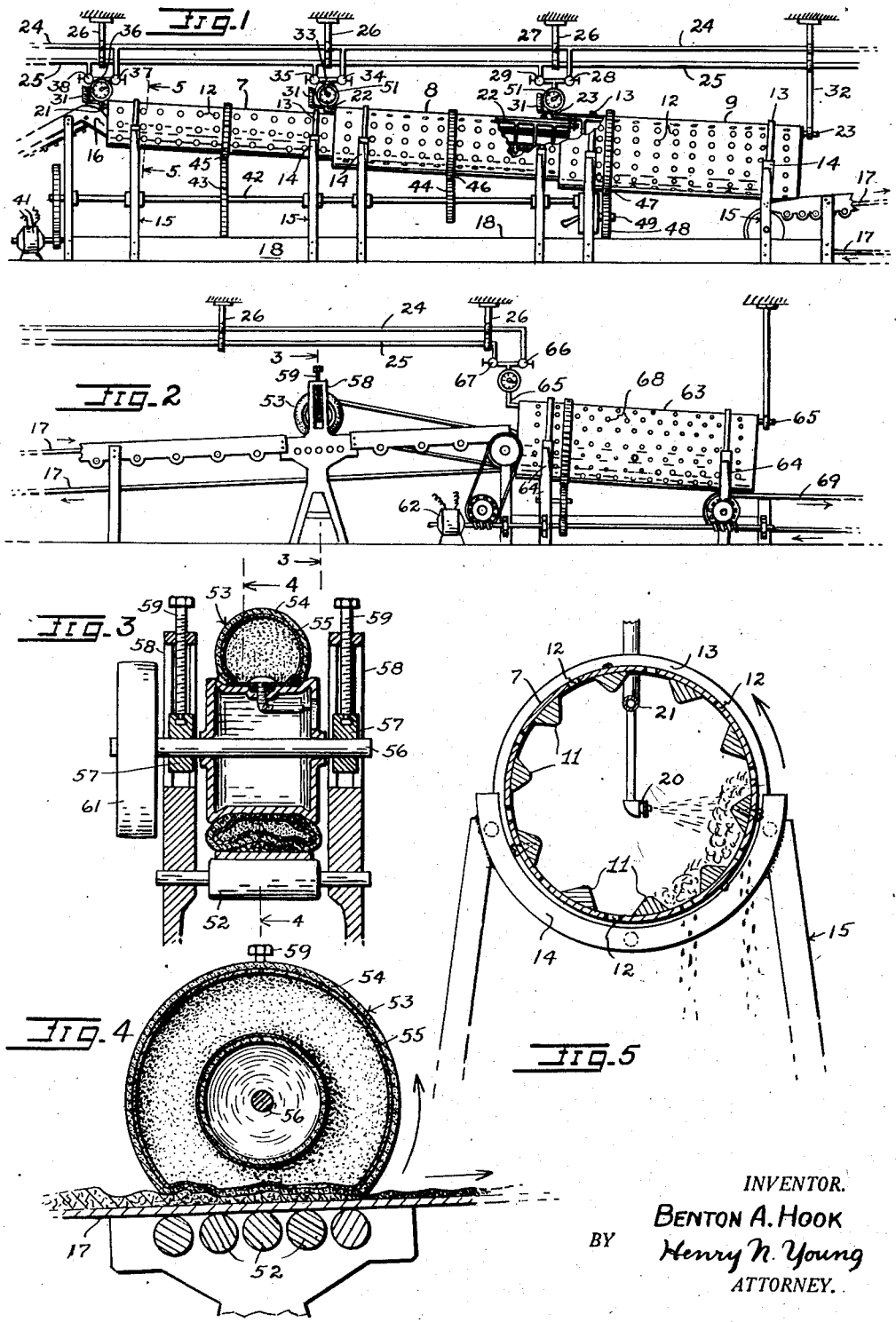
INVENTOR.
BENTON A. HOOK
BY Henry N. Young
ATTORNEY.

Patented Nov. 12, 1935

2,020,645

UNITED STATES PATENT OFFICE 2,020,645

PREPARING GREENS FOR CANNING

Benton A. Hook, Oakland, Calif.

Application July 12, 1933, Serial No. 680,099

7 Claims. (Cl. 99—8)

The invention relates to a process and means for preparing greens, such as spinach and other leafy vegetables, for the canning thereof.

In the preparation of greens for canning, it is the practice to wilt the same for reducing their bulk and thereby obtain a solid pack of the prepared product, it being noted that home cooking processes also reduce the bulk of greens. For effecting a quick wilt, heat is used, and the method of application of wilting heat largely determines the color, texture, palatability, and other qualities of the pack. It is accordingly a general and major object of the present process to provide a uniform product in which all the desirable qualities of the vegetable are retained to a maximum degree, whereby to present to the consumer a product which is at least the equal, and may be the superior, of the same greens as prepared in the home.

Another object is to provide a process which is particularly adapted for use by commercial canneries in a continuous preparation of a uniform product having the desired qualities.

A further object is to provide a simple and effective apparatus for carrying out the process of the present invention.

The invention possesses other objects and features of advantage, some of which, with the foregoing, will be set forth, or be apparent, in the following description of a typical embodiment thereof, and in the accompanying drawing, in which, Figures 1 and 2 are somewhat diagrammatic elevations of different portions of a preferred apparatus for carrying out the present process, a portion of the structure being broken out in Figure 1.

Figure 3 is an enlarged section at 3—3 in Figure 2.

Figure 4 is a section at 4—4 in Figure 3.

Figure 5 is an enlarged fragmentary section at 5—5 in Figure 1.

Essentially, the complete present process comprises the successive steps of effecting a partial wilt of the greens at a relatively high temperature and for a relatively short time, completing the wilt at a relatively low temperature and for a relatively long time, compacting the wilted product to eliminate air pockets and express excess liquid therefrom, and supplying liquid to fill any voids in the product, which product may then be placed and sealed in cans. While the foregoing process is equally applicable to preparing greens such as dandelion, mustard, beet, etc. for canning, its major application has been made in preparing spinach for canning, and the treating of spinach may be generally assumed in the following description.

As is illustrated, the apparatus for carrying out the foregoing process includes mutually aligned and open-ended tubes or drums 7, 8, and 9 mounted for rotation about their axes and having their line inclined to the horizontal, the drum 7 being at the higher end of the line. Interiorly thereof, the drums are longitudinally fluted whereby, as they rotate, a given portion of loose material therein will be carried upwardly on a side until it falls to an advanced point at the inclined bottom of the drum, the process being repeated until such material portion is delivered from the lower drum end.

At its lower end, the drum 7 extends slightly into the upper end of the drum 8 and the lower end of the latter drum extends similarly into the upper end of the drum 9; in this manner, greens delivered in the upper end of the drum 7 are finally discharged from the lower end of the drum 9, the succession of drums thus operating as a conveyor while effecting a separating and impacting treatment of the greens as they traverse the drums. Preferably, and as shown, the drums 8 and 9 are somewhat larger at their lower ends than are the drums 7 and 8 at their lower ends respectively. While the drums 7 and 8 and 9 are each shown as of uniform cross-section, whereby they are successively larger in their line, these drums might be conically tapered and of like size.

As particularly brought out in Figure 5, the interior fluting of the drums is provided by means of laterally spaced cleats 11 of triangular section fixed to the drums. Between the cleats, the drums are provided with lines of perforations 12 for the discharge of liquid therethrough. Bearing rings 13 are fixed on each drum and said rings engage in suitable anti-friction bearing saddles or sockets 14 provided on frames 15 whereby the tubes are supported in their places for the rotation thereof. Fresh greens are delivered within the upper end of the tube 7 from a hopper 16, while the treated greens are discharged from the tube 9 upon a conveyor belt 17. A catch-basin 18 underlies the drums for receiving the liquid discharged therefrom; in the present instance, the basin structure is defined within the area defined by the feet of the frames 15.

It will now be noted that the greens in the drum 7 are treated with cold water for washing them as they pass through the drum. Within the drum 8, the washed greens are treated with hot water at a temperature of preferably no less than one hundred ninety degrees Fahrenheit and for the shortest possible time in which the greens may be reduced to a limp condition without an appreciable degree of cooking or dehydration thereof. In practice, this first wilting step may take from one-half to three minutes, depending on the conditions under which the greens were grown and the physical condition of the greens as they are actually delivered to the apparatus.

Within the drum 9, the partly wilted greens are treated with hot water at a temperature of from one hundred twenty five to one hundred forty degrees Fahrenheit for a period of from four to fifteen minutes as may be required to complete the wilt. Generally speaking, the time required for this step will vary inversely with the time for the first wilting step in the drum 8.

It will now be noted that the final wilt in the drum 9 is effected at a temperature considerably below that at which a cooking of the greens or a break-down of the chlorophyll therein from its normal colloidal form may occur. The first treatment in the drum 8 is understood to barely start the wilt by making the greens limp through breaking down the surface cells, and this treatment is applied for such a short time that the fresh green color of the greens is not appreciably effected through any aforesaid break-down of the chlorophyll. For spinach, the critical temperature referred to has been found to be approximately one hundred sixty degrees Fahrenheit, this being the temperature above which phæoplytn is formed through a break-down of the chlorophyll.

Preferably, the described water treatments in the drums are effected through spraying the greens as they travel upwardly with the rising side of a drum. To this end, pipes 21, 22, and 23 are extended through the drums 7, 8, and 9 respectively, said pipes provided with radial spray nozzles 20 therealong for spraying water therefrom and against the greens. Manifold pipes 24 and 25 respectively supply necessary hot and cold water for the spray pipes, said manifold pipes shown as disposed above the drums in line therewith and carried by suitable hangers 26. At its upper end, the spray pipe 23 in the drum 9 extends from the drum and externally of the drum 8 to a connection with the hot and cold water manifold pipes 24 and 25 through a T 27, and valves 28 and 29 are provided at the inlet sides of said T whereby a mixture of hot and cold water may be supplied to the spray pipe 23 at the desired temperature for treating the greens in the drum 9. Preferably, and as shown, an indicating thermostat 31 would be interposed in the pipe 23 between the T and drum whereby the spraying temperature may be determined for adjustment to its desired value. The closed end of the pipe 23 may extend from the drum 9 to engage a hanger 32 whereby said pipe is supported in its appointed place by and between the T 27 and the hanger 32.

The water connections for the spray pipe 22 are similar to those for the pipe 23 and comprise a T 33 and valves 34 and 35 connecting this pipe with the pipes 24 and 25. The pipe 22 is also provided with an indicating thermostat 31, and its closed end may be fixed to the upper end of the pipe 23 in the drum 9 for support with the latter pipe as is indicated in Figure 1; in this manner, the pipe 22 is supported in its appointed place. Since the desired temperature for the water in the pipe 22 is usually that in the manifold pipe 24, the valve 35 would normally be closed. The connections and support for the spray pipe 21 in the drum 7 are shown as those for the pipe 22, and comprise a T 36 and valves 37 and 38. In this case, however, the valve 37 would be normally kept closed, or nearly so.

It will be understood that the described heat treatment of the greens in the independently rotatable conveyor drums by means of a hot water spray permits a prompt and accurately timed application of the different required temperatures, and that the relative times of treatment in the different drums is controlled by the relative diameters and rates of rotation of the drums. As particularly shown, a motor 41 is provided for effecting rotations of the drums 7, 8, and 9 at appropriate rotative speeds. The motor 41 is arranged to rotate a shaft 42 carrying gears 43 and 44 which respectively mesh with ring gears 45 and 46 on the drums 7 and 8. The drum 9 carries a ring gear 47 which meshes with a gear 48 carried on a shaft 49, said shaft being driven from the shaft 42 through a suitable variable speed transmission which is indicated generally at 50; in this manner, any required ratio of rotative speeds may be provided between the drums 8 and 9, and the relative times of heat treating of the greens therein may thus be adjustably varied.

It will now be noted that the preliminary wilt treatment in the drum 8 essentially involves the provision of heat at a relatively high temperature and at a high quantity rate for the relatively short time of treatment whereby to complete this wilting step as quickly as possible and thereby avoid the undesirable breakdown of the chlorophyll with a consequent darkening of the color of the greens. In the present instance the required quantity of heat is provided through the discharge of a relatively large volume of hot water against the greens as they advance through the drum 8. The relatively long treatment in the drum 9 at a relatively low temperature is, on the other hand, effected with the provision of the cooler water at a lower flow rate.

For insuring a most effective application of heat to the greens in the drums 8 and 9, the water may be emitted from the spray nozzles 20 under considerable pressure, this being particularly desirable for the treatment in the drum 9. It will be understood that a pressure discharge of the hot water assures the complete heat treatment of the greens in the drums through the production of a cutting spray chiefly against the greens as they are falling within the drum; the latter relation is seen to be indicated in Figure 5. Preferably, and as indicated in Figure 1, indicating pressure gauges 51 are interposed in the various nozzle pipes for use in adjusting the discharge pressures at the different nozzles.

As successive portions of the wilted greens are delivered upon the conveyor belt 17, they may vary somewhat as to their water content and their density, or degree of compactness. Since a uniform pack of the greens is desired, means are provided for insuring a uniform product for delivery to the cans (not shown), and to this end the wilted greens are compacted under a uniform pressure and to a uniform density before they are placed in the cans in which they are to be sealed. In the present apparatus for continuous operation, the greens on the conveyor belt are passed with the belt between a set of relatively small rollers 52 supporting the belt thereat, and a relatively large upper roller 53 directly engaging the wilted greens on the belt for coaction with the rollers 52 to compact the greens on the belt.

To insure a uniform compacting pressure upon the greens by the roller 53, the latter is preferably provided with a yielding tread in the form of a pneumatic tire 54 having an inner tube 55 for inflation to a desired and relatively low degree of pressure therein. It will be particularly noted that the use of a pneumatically inflated tire on the roller 53 insures a uniform and substantially constant degree of pressure in all parts of succeeding sections of the greens on the belt therebeneath whereby the density of the greens as compacted on the belt is practically constant regardless of their initial condition or variations in the cross-section of the line of greens as it passes to and beneath the roller 53. The tire pressure will usually be of the order of twenty pounds per square inch whereby to insure the beforementioned constancy of compacting pressure without injury to the greens.

The roller shaft 56 is shown as mounted in bearing blocks 57 slidably and adjustably engaged in upright guideways provided in standards 58 at opposite sides of the belt whereby the positioning of the roller 53 with respect to the belt and the greens thereon may be adjusted as by means of screws 59 swivelled in the blocks 57 and threadedly engaging the standard heads. The shaft 56 preferably carries a pulley 61 whereby it may be positively driven by a motor 62 in synchronism with the conveyor belt 11, and no added strain is put upon the belt as would be the case if the belt were used as a means for driving the roller 53.

The described treatment of the wilted greens beneath the roller 53 is preferably arranged to compact the greens beyond the required degree for canning whereby to insure an elimination of air pockets and excess moisture therefrom, and means are accordingly provided for loosening and re-hydrating the mass of compacted greens to a fixed degree. In the present instance, said means comprises an open-ended conveyor drum 63 mounted for rotation about its longitudinal axis, said axis inclined to the horizontal. The drum 63 is arranged and constituted generally as the drums 7, 8, and 9, is rotatably mounted on bearing frames 64, and receives a spray pipe 65 therethrough, said pipe provided with nozzles therealong as the other spray pipes. The pipe 65 is connected with the cold water manifold pipes 24 and 25 through valves 66 and 67, and the drum 63 is perforated and interiorly fluted as are the other drums, but its perforations 68 are preferably smaller than the perforations 12 of the latter drums whereby to provide a retarded draining of water from the greens being treated. It will be understood that this step might be dispensed with if an over-compacting is not effected between the rollers 52 and 53.

The product discharged from the drum 63 is ready for placement in the cans and may be delivered to suitable canning mechanism (not shown) on a conveyor belt 69. The uniform product discharged upon the belt 69 is arranged to be of the consistency desired in the cans whereby neither compacting or loosening, or draining or hydration, thereof is subsequently required in the cans for providing a pack of desired quality; it will therefore be understood that the usual weighing-in step of canning may safely be omitted with a resulting economy of time and expense. The described heat treatment, it is noted, effects a fixing of the chlorophyll of the greens whereby a subsequent pressure cooking thereof in the cans does not darken them; it will be understood that the described wilting process does not appreciably cook the greens.

While the wilting and re-hydrating steps of the now-described process are shown as arranged to be effected in rotary conveyor drums, it will be understood that these steps might be effected by submersion of the greens in vats of water at the required temperatures for obtaining the desired results. The use of the drums and spray pipes has, however, been found generally superior by reason of the more positive control of the actual timing of the steps of treatment, particularly as to the first wilt step, and is therefore preferred in practice.

It will be noted further that the drums 7, 8, and 9 might be combined in a single rotary drum, whereby the various spray pipes would all be operative therein with the lengths of each pipe appropriate to the time required for treatment with the water from each; this suggested arrangement is understood as constituting a consideration of the drums 7, 8, and 9 as sections or portions of a single rotary drum in which the functions now performed in the three drums are all performed in the same order. Since in practice the drum assembly may be sixty feet long, the disclosed sectional construction is generally superior through facilitating the rotary support of the drums, the support of the spray pipes therein, and adjustment in the relative timing for the different steps.

From the foregoing description taken in connection with the accompanying drawing, the advantages of the disclosed process and apparatus will be readily understood by those skilled in the art to which the invention appertains, and while I have described the principle of operation, together with a device which I now consider to be a preferred embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a process for wilting greens for the canning thereof, the steps of effecting an initial heat treating of the greens at a temperature well above that for the formation of phæophytin and for a limited period of time during which the formation of phæophytin is not evident, and thereafter completing the wilt at a temperature below that for the formation of phæophytin in the greens, whereby the natural color of the greens is retained in the wilted product.

2. In a process for preparing greens for canning, the steps of effecting a preliminary wilt of the greens at a temperature approximating the boiling temperature of water and for a relatively short time, and continuing the wilt at a temperature appreciably below that at which a breakdown of the chlorophyll will occur in an average sample of the greens and for a relatively long time to complete the wilt.

3. In a process for preparing greens for canning, the steps of effecting a preliminary wilt of the greens at a temperature appreciably exceeding the lowest temperature at which the production of phæophytin would occur in the greens and for a relatively short time, and continuing the wilt at a temperature appreciably below the aforesaid lowest temperature for the production of phæophytin and for a relatively long time to complete the wilt.

4. In a process for preparing greens for canning, the steps of effecting a preliminary wilt of the greens at a temperature above 190 degrees Fahrenheit for a relatively short time, and continuing the wilt to a conclusion at a temperature not exceeding 140 degrees Fahrenheit.

5. In a process for preparing greens for canning, the steps of effecting a preliminary wilt of the greens by the application thereto of water at a temperature exceeding 190 degrees Fahrenheit for a relatively short time, and continuing the wilt to a conclusion by the application thereto of water at a temperature not exceeding 140 degrees Fahrenheit.

6. In a process for preparing greens for canning, the steps of effecting a preliminary heating of the greens at a temperature above 190 degrees Fahrenheit for not over three minutes, and thereafter wilting the greens at a temperature below 140 degrees Fahrenheit.

7. In combination with an operating rotary tumbling drum, the process of preparing greens for canning which comprises the steps of effecting a preliminary wilt heating of the greens in the drum at a temperature above 190 degrees Fahrenheit for not over three minutes, and completing the wilt in the tumbler drum at a temperature below 140 degrees Fahrenheit.

BENTON A. HOOK.